Feb. 26, 1957 A. DEL PESCO 2,782,504
FOOT MEASURING DEVICE
Filed Sept. 15, 1950 3 Sheets-Sheet 1

INVENTOR.
Andrew Del Pesco
BY
Nathaniel Frucht
ATTORNEY

Feb. 26, 1957

A. DEL PESCO 2,782,504

FOOT MEASURING DEVICE

Filed Sept. 15, 1950

INVENTOR.
Andrew Del Pesco
BY
Nathaniel Frucht
ATTORNEY

United States Patent Office 2,782,504
Patented Feb. 26, 1957

2,782,504

FOOT MEASURING DEVICE

Andrew Del Pesco, Danielson, Conn.

Application September 15, 1950, Serial No. 185,081

4 Claims. (Cl. 33—3)

The present invention relates to foot measuring devices, and has particular reference to the construction of a device for indicating proper shoe sizes.

The principal object of the invention is to provide a foot measuring device which discloses the proper shoe size, taking into consideration body weight and necessary allowance for growth.

Another object of the invention is to provide a foot measuring device which is adjustable to correspond with the size numbers and foot lasts of different shoe manufacturers.

A further object of the invention is to provide a foot measuring device which measures both feet simultaneously, and thus discloses variations and differences in the length and the width of the feet.

An additional object of the invention is to provide a foot measuring device which can be set to disclose the effect of special shoe construction features such as arch supports on the foot being measured.

Other objects of the invention are to provide a simple, compact foot measuring device which is strongly built of a small number of readily manufactured and assembled parts, whereby the device is sturdy in use, inexpensive to manufacture and store, and can be readily maintained in sterile condition.

With the above and other objects and advantageous features in view, the invention consists of a novel arrangement of parts more fully disclosed in the detailed description following, in conjunction with the accompanying drawings, and more specifically defined in the claims appended thereto.

Figure 1:
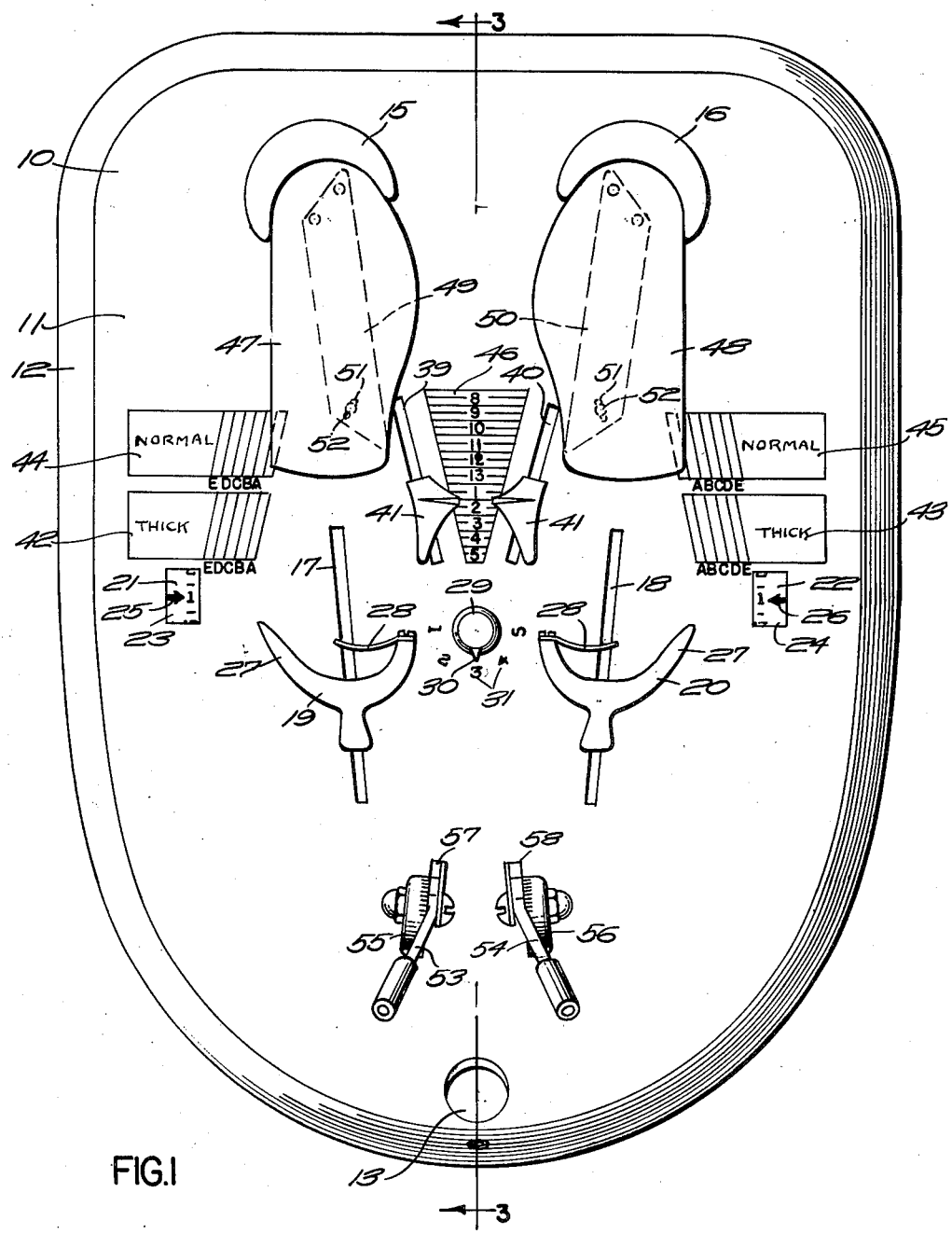
Fig. 1 is a top plan view of a foot measuring device embodying the novel invention.

It has been found desirable to provide a foot measuring device which measures both feet while subjected to the weight of the person being measured, the device having adjustable parts and scales so that the proper shoe size for each foot is indicated. To ensure a fit which takes growth into account, it is preferred to have the length measuring parts set to provide a suitable toe clearance, and the parts are further designed so that the effect of an arch support is disclosed. Further, since the size numbers and lasts of different manufacturers do not generally correspond, I prefer to equip the foot measuring device with a compensating mechanism whereby the correct size number for the shoes of a selected manufacture is obtained.

Referring to the drawings, the foot measuring device 10 includes a flat base 11 having a depending tapered edge 12, the forward end having an opening 13 for lifting, and the rear end having casters 14 whereby the base slightly inclines downwardly when in measuring position.

Fixed heel abutments 15, 16 extend upwardly from the rear end of the base, and elongated slots 17, 18, which are slightly inclined towards each other as shown in Fig. 1, slidably receive toe elements 19, 20, whereby the toe elements may be moved forwardly to contact the toes when the heels are set into the heel abutments 15, 16. As the toe elements are moved, indicator plates 21, 22, which are visible in openings 23, 24 are correspondingly moved to designate the proper shoe length against arrow pointers 25, 26 which extend from the outer sides of the openings 23, 24.

Each toe element includes an arcuate portion 27 and a transverse spring portion 28. This spring portion is set so that it is spaced away from the arcuate portion. After the foot is placed on the arch plates and the arcuate portion is moved towards the toes, the spring portion hits the big toe and prevents further movement of the arcuate portions. As a result the measuring of the length of the shoe includes the clearance space between the arcuate portion and the spring portion.

Figure 2:
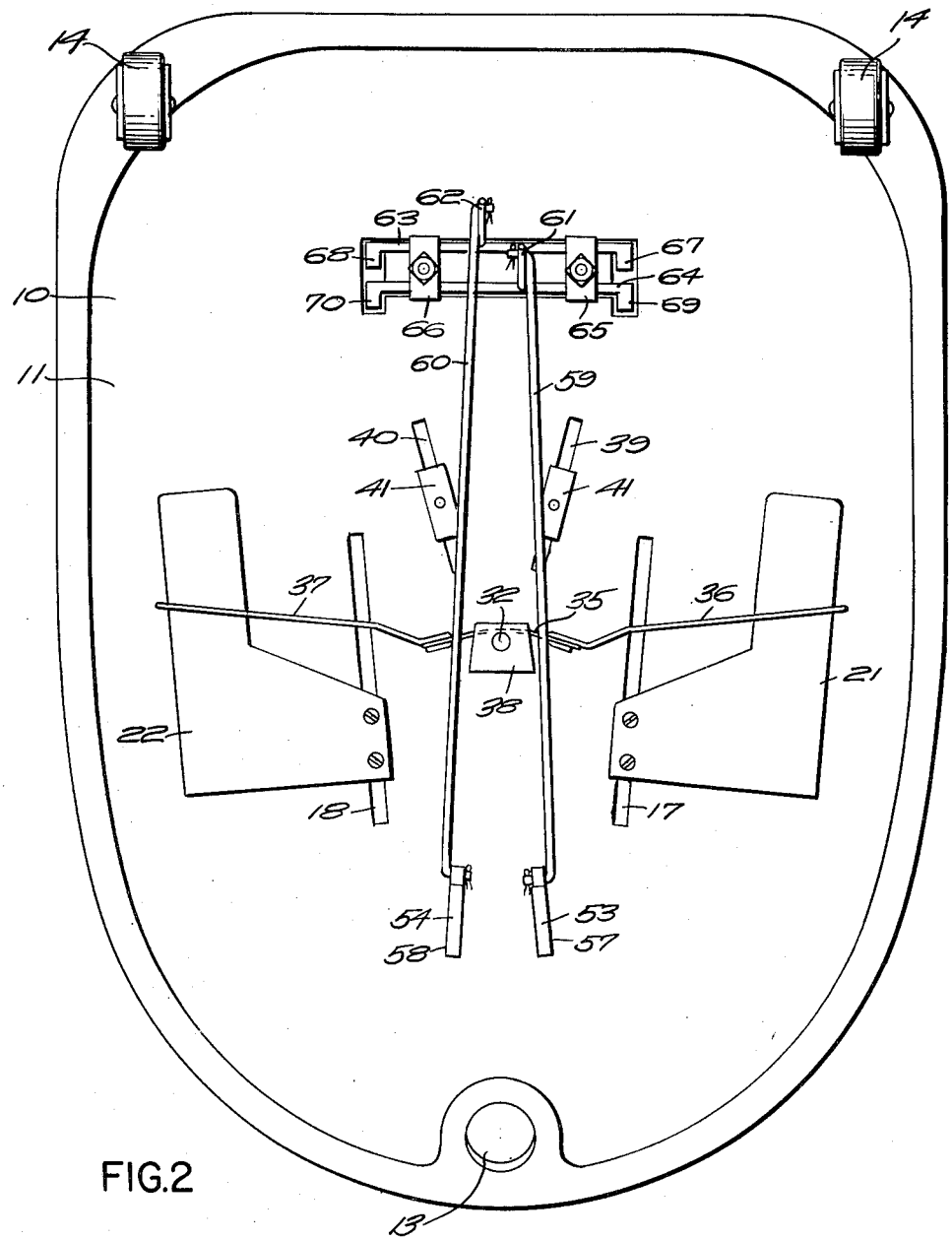
Fig. 2 is a bottom plan view thereof.
Figure 3:
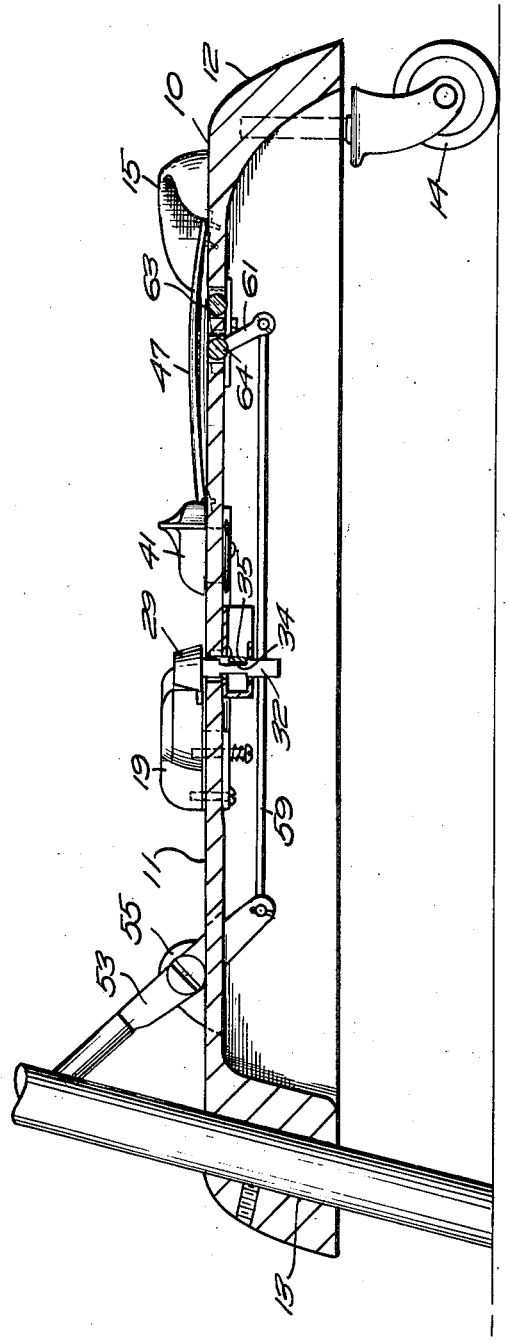
Fig. 3 is a central vertical section in the line 3—3 of Fig. 1.

A manually movable knob 29 is centrally positioned in the base 11, and has a pointer 30 which may be set to a selected indicia 31. The knob turns a post 32, see Fig. 3, which has a recess 34 in which a transverse spring bar 35, see Fig. 2, seats; the ends of the spring bar are secured to rods 36, 37, which extend under the slidable indicator plates 21, 22 and are bent upwardly and then inwardly to form the arrow pointers 25, 26. As the knob 29 is turned from the indicia 1 to 6, the spring bar, which extends outwardly from the side slots in a sheet metal casing 38, is arched, and the arrow pointers move to designate different manufacturers' shoe size numbers, which vary with different style lasts.

Referring now to Fig. 1 two slightly converging slots 39, 40 are provided in generally central location, in which inner edge slides 41 are slidably positioned. These slides are slightly curved to engage the inner metatarsal edge of the foot, whereupon the outer edges of the feet rest on indicators 42, 43 for thick feet or on indicators 44, 45 for normal feet, which are lined to disclose shoe widths A to E. A central chart 46 is provided between the slots 39, 40 to designate the position of the metatarsal arch.

Arch plates 47, 48 of leather or the like are secured to the heel abutments 15, 16, and conceal flat spring strips 49, 50 which are locked to the base at their upper ends and are slotted at the lower ends as indicated at 51 to receive headed slot pins 52 mounted in the base, whereby the spring strips may be adjustably raised and arched to simulate arch supports. Two levers 53, 54 are pivotally secured to bosses 55, 56 and extend downwardly through slots 57, 58 in the base, see Fig. 2, and are pivotally attached to the rear ends of rods 59, 60. The front ends of the rods 59, 60 are pivotally secured to depending arms 61, 62 of two spaced cross rods 63, 64 rotatably mounted in rearings 65, 66. The rods have cam ends 67, 68 and 69, 70 respectively which are movable to press upwardly against the spring strips 49, 50 as the levers 53, 54 are turned. The bosses are calibrated, see Fig. 1, to show the extent of the arch. The operator is thus able to arch the spring strips and to space the point of maximum arch, to simulate a proper arch support under standing and walking conditions; the arch supports, if desired, may be independently raised.

The operation of the foot measuring device is now clear. When it is desired to measure a person for shoes, the person stands on the base, with the heels in the heel abutments. The length of the shoes is measured by sliding the toe elements to contact the big toes with the spring portions 28, which are set to provide proper toe clearance. The knob 29 is turned to correspond to the manufacturer's style and last, thus setting the arrow pointers 23, 24, and the indicator plates 21, 22 shift to disclose the proper size number. The metatarsal slides 41 are now adjusted, and the width is disclosed on the indicators 42, 43 or 44, 45, any variation in metatarsal arch positioning being shown on the chart 46.

The proper size and width having been determined the levers 53, 54 are moved to create an arch support, thus disclosing the effect to the person being fitted, and indicating the desirability of an arch support shoe when flat-footedness is found.

Although I have disclosed a specific constructional embodiment of the invention, it is obvious that changes in the size, shape, and arrangement of the parts may be made to suit different foot measuring requirements, without departing from the spirit and the scope of the invention as defined in the appended claims.

I claim:

1. In a foot measuring device, a base, spaced fixed heel abutments on said base, toe engaging elements slidably mounted on said base, size indicia including a pointer and a movable size indicator, mechanism for shifting the movable size indicator in accordance with movement of the toe engaging elements, means for initially setting the pointer in accordance with a manufacturer's style last, and means for indicating the width of the foot.

2. In the combination of claim 1, said toe engaging elements having yieldable transverse spring portions adjustable to provide a desired toe clearance.

3. In the combination of claim 1, said width indicating means comprising indicia for normal feet and for thick feet.

4. In the combination of claim 1, said width indicating means comprising means for indicating variations in metatarsal arch positioning.

References Cited in the file of this patent
UNITED STATES PATENTS

| | | |
|---|---|---|
| 1,010,451 | O'Sullivan | Dec. 5, 1911 |
| 1,666,040 | Bliss | Apr. 10, 1928 |
| 1,693,119 | Pym | Nov. 27, 1928 |
| 1,921,997 | Bliss | Aug. 8, 1933 |
| 1,940,240 | Bliss | Dec. 19, 1933 |
| 2,181,930 | Wheeler | Dec. 5, 1939 |
| 2,477,817 | Mirti | Aug. 2, 1949 |
| 2,554,285 | Westbrook | May 22, 1951 |
| 2,624,943 | Booth | Jan. 13, 1953 |